United States Patent
Chang et al.

(10) Patent No.: US 7,881,016 B2
(45) Date of Patent: Feb. 1, 2011

(54) METHOD AND APPARATUS FOR SPRING CLIP LATCH FOR RETAINING HARD DISK DRIVE ACTUATOR ONTO BRACKET OF FLEX CIRCUIT ASSEMBLY

(75) Inventors: Jen-Yuan Chang, San Jose, CA (US); Ta-Chang Fu, San Jose, CA (US); Edgar D. Rothenberg, San Jose, CA (US); Russell D. Moates, San Jose, CA (US)

(73) Assignee: Hitachi Global Storage Technologies, Netherlands, B.V., Amsterdam (NL)

(*) Notice: Subject to any disclaimer, the term of this patent is extended or adjusted under 35 U.S.C. 154(b) by 774 days.

(21) Appl. No.: 11/701,313

(22) Filed: Jan. 31, 2007

(65) Prior Publication Data
US 2008/0180854 A1 Jul. 31, 2008

(51) Int. Cl.
*G11B 5/55* (2006.01)
*G11B 21/08* (2006.01)
*G11B 3/10* (2006.01)

(52) U.S. Cl. .............. 360/264.2; 360/265.1; 29/603.03

(58) Field of Classification Search ............. 29/603.03; 360/265.1, 264.2
See application file for complete search history.

(56) References Cited

U.S. PATENT DOCUMENTS

| | | | |
|---|---|---|---|
| 5,375,021 A | 12/1994 | Boeckner | |
| 5,781,380 A | 7/1998 | Berding et al. | |
| 5,818,667 A | 10/1998 | Larson | |
| 5,907,452 A * | 5/1999 | Kan | 360/97.01 |
| 5,953,183 A | 9/1999 | Butler et al. | |
| 6,480,362 B1 * | 11/2002 | Yoshida et al. | 360/264.2 |
| 6,543,124 B2 * | 4/2003 | Eckerd et al. | 29/603.03 |
| 6,934,126 B1 | 8/2005 | Berding et al. | |
| 7,227,725 B1 * | 6/2007 | Chang et al. | 360/264.2 |
| 7,245,458 B2 * | 7/2007 | Zhang et al. | 360/264.2 |
| 7,495,866 B2 * | 2/2009 | Izumi et al. | 360/264.2 |
| 7,616,408 B2 * | 11/2009 | Choi et al. | 360/264.2 |
| 7,667,931 B1 * | 2/2010 | Brause et al. | 360/264.2 |
| 2003/0002222 A1 * | 1/2003 | Abe | 360/264.2 |
| 2003/0137776 A1 | 7/2003 | Zhoa et al. | |
| 2004/0228039 A1 | 11/2004 | Wu et al. | |
| 2005/0013055 A1 | 1/2005 | Ho et al. | |
| 2006/0164762 A1 * | 7/2006 | Choi et al. | 360/264.2 |

\* cited by examiner

*Primary Examiner*—Julie Anne Watko

(57) ABSTRACT

A latching mechanism for a flex cable bracket. The latching mechanism includes a position limiter. The position limiter prevents movement of an actuator assembly installed thereon. The latching mechanism also includes a spring clip. The spring clip has spring functionality and a cantilever beam to retain the actuator assembly when installed thereon. The latching mechanism further includes an orientation position limiter. The orientation position limiter prevents a rocking motion of the actuator assembly. The position limiter and the spring clip and the orientation position limiter are integrated into structure of the flex cable bracket.

12 Claims, 10 Drawing Sheets

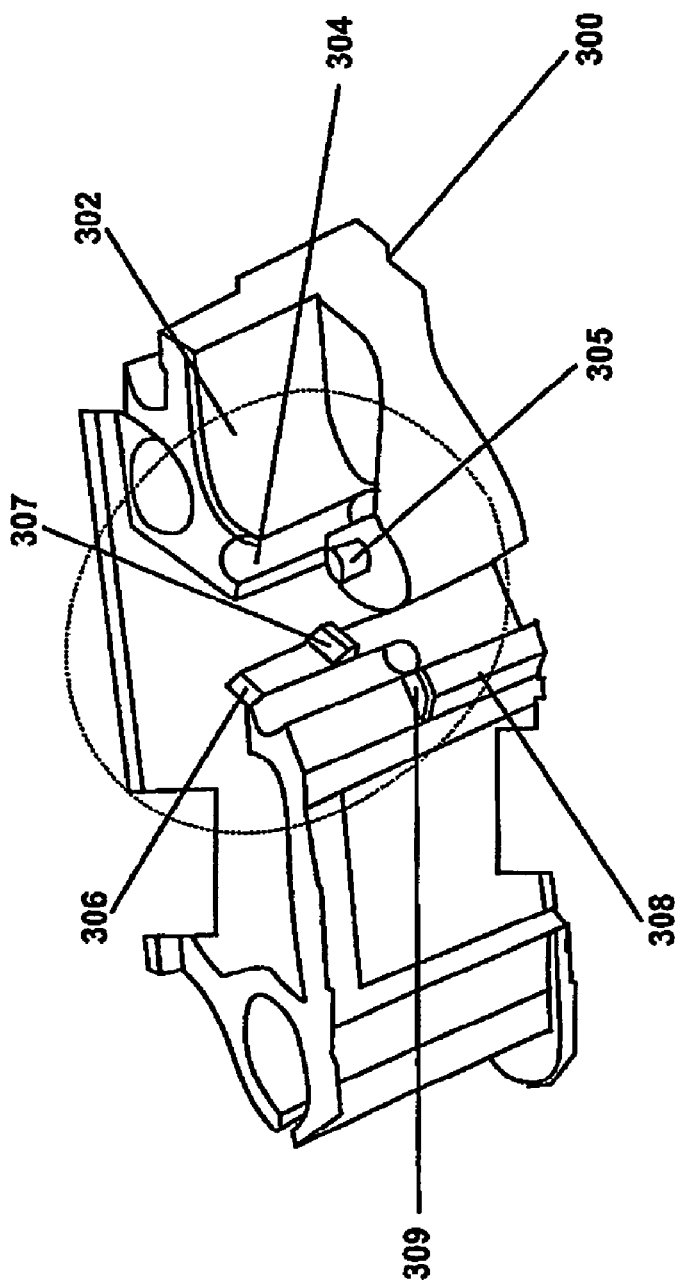

METHOD AND APPARATUS FOR SPRING CLIP LATCH FOR RETAINING HARD DISK DRIVE ACTUATOR ONTO BRACKET OF FLEX CIRCUIT ASSEMBLY

TECHNICAL FIELD

The present invention relates to the field of hard disk drive development.

BACKGROUND ART

Direct access storage devices (DASD) have become part of everyday life, and as such, expectations and demands continually increase for greater speed for manipulating and for holding larger amounts of data. To meet these demands for increased performance, the mechano-electrical assembly in a DASD device, specifically the Hard Disk Drive (HDD) has evolved to meet these demands.

Advances in magnetic recording heads as well as the disk media have allowed more data to be stored on a disk's recording surface. The ability of an HDD to access this data quickly is largely a function of the performance of the mechanical components of the HDD. Once this data is accessed, the ability of an HDD to read and write this data quickly is primarily a function of the electrical components of the HDD.

A computer storage system may include a magnetic hard disk(s) or drive(s) within an outer housing or base containing a spindle motor assembly having a central drive hub that rotates the disk. An actuator includes a plurality of parallel actuator arms in the form of a comb that is movably or pivotally mounted to the base about a pivot assembly. A controller is also mounted to the base for selectively moving the comb of arms relative to the disk.

Each actuator arm has extending from it at least one cantilevered electrical lead suspension. A magnetic read/write transducer or head is mounted on a slider and secured to a flexure that is flexibly mounted to each suspension. The read/write heads magnetically read data from and/or magnetically write data to the disk. The level of integration called the head gimbal assembly (HGA) is the head and the slider, which are mounted on the suspension. The slider is usually bonded to the end of the suspension.

A suspension has a spring-like quality, which biases or presses the air-bearing surface of the slider against the disk to cause the slider to fly at a precise distance from the disk. Movement of the actuator by the controller causes the head gimbal assemblies to move along radial arcs across tracks on the disk until the heads settle on their set target tracks. The head gimbal assemblies operate in and move in unison with one another or use multiple independent actuators wherein the arms can move independently of one another.

SUMMARY OF THE INVENTION

A latching mechanism for a flex cable bracket. The latching mechanism includes a position limiter. The position limiter prevents movement of an actuator assembly installed thereon. The latching mechanism also includes a spring clip. The spring clip has spring functionality and a cantilever beam to retain the actuator assembly when installed thereon. The latching mechanism further includes an orientation position limiter. The orientation position limiter prevents a rocking motion of the actuator assembly. The position limiter and the spring clip and the orientation position limiter are integrated into structure of the flex cable bracket.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to embodiment(s) of the present invention. While the invention will be described in conjunction with the embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

The discussion will begin with an overview of a hard disk drive and components connected within. The discussion will then focus on embodiments of this invention that provide for a latching mechanism in a flex bracket to retain an actuator yoke engaged therewith. Finally fabrication of the latching mechanism will be discussed. Although embodiments of the latching mechanism will be described in a flex bracket of a microactuator, it is understood that the embodiments described herein are useful outside of the art of microactuators, such as devices requiring high frequency transmission between two devices that have relative motion.

Overview

Figure 1:
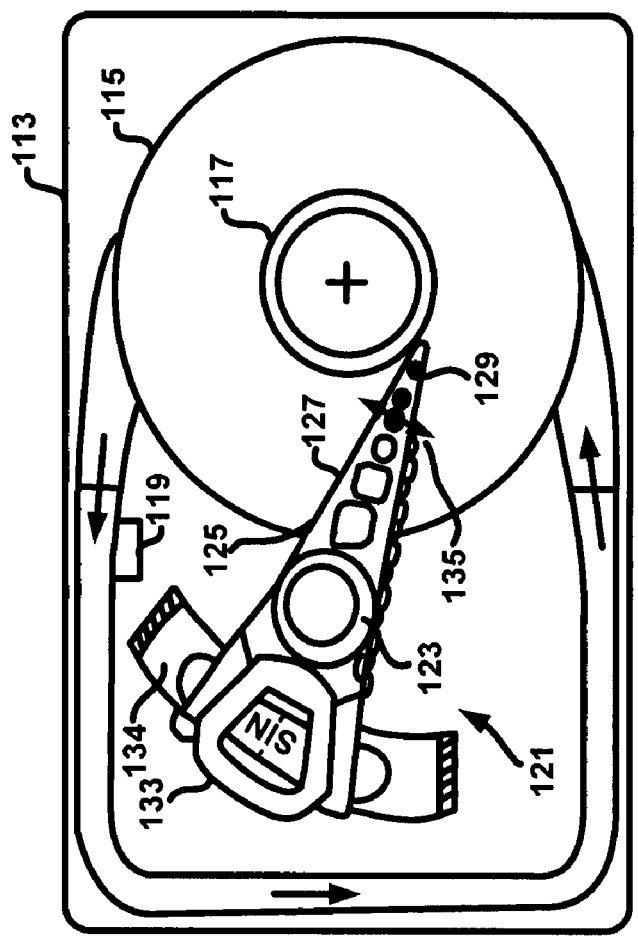
FIG. 1 is plan view of an HDD in accordance with an embodiment of the present invention.

With reference now to FIG. 1, a schematic drawing of one embodiment of an information storage system comprising a magnetic hard disk file or drive 111 for a computer system is shown. Drive 111 has an outer housing or base 113 containing a disk pack having at least one media or magnetic disk 115. A spindle motor assembly having a central drive hub 117 rotates the disk or disks 115. An actuator 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered electrical lead suspension (ELS) 127 (load beam removed). It should be understood that ELS 127 may be, in one embodiment, an integrated lead suspension (ILS) that is formed by a subtractive process. In another embodiment, ELS 127 may be formed by an additive process, such as a Circuit Integrated Suspension (CIS). In yet another embodiment, ELS 127 may be a Flex-On Suspension (FOS) attached to base metal or it may be a Flex Gimbal Suspension Assembly (FGSA) that is attached to a base metal layer. The ELS may be any form of lead suspension that can be used in a Data Access Storage Device, such as a HDD. A magnetic read/write transducer or head is mounted on a slider 129 and secured to a flexure that is flexibly mounted to each ELS 127. The read/write heads magnetically read data from and/or magnetically write data to disk 115. The level of integration called the head gimbal assembly is the head and the slider 129, which are mounted on suspension 127. The slider 129 is usually bonded to the end of ELS 127

ELS 127 has a spring-like quality, which biases or presses the air-bearing surface of the slider 129 against the disk 115 to cause the slider 129 to fly at a precise distance from the disk. ELS 127 has a hinge area that provides for the spring-like quality, and a flexing interconnect (or flexing interconnect) that supports read and write traces through the hinge area. A voice coil 133, free to move within a conventional voice coil motor magnet assembly 134 (top pole not shown), is also mounted to arms 125 opposite the head gimbal assemblies. Movement of the actuator 121 (indicated by arrow 135) by controller 119 causes the head gimbal assemblies to move along radial arcs across tracks on the disk 115 until the heads settle on their set target tracks. The head gimbal assemblies operate in a conventional manner and always move in unison with one another, unless drive 111 uses multiple independent actuators (not shown) wherein the arms can move independently of one another.

Figure 2:
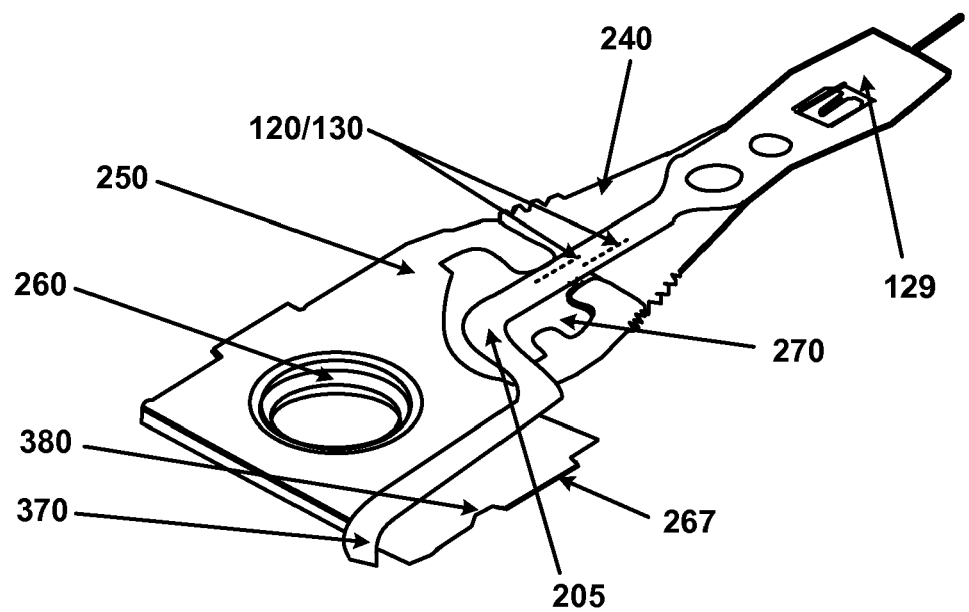
FIG. 2 is a top plan view of an exemplary electrical lead suspension (ELS) according to one embodiment of the present invention.

Referring now to FIG. 2, a top plan view of an exemplary electrical lead suspension (ELS) according to an embodiment of the present invention. The read and write traces, 120 and 130, pass through the hinge center 270 of ELS 127, where load beam 240 connects, via hinge plate 250, to mount plate 260, according to one embodiment of the present invention. Slider 129 resides toward the end of ELS 127, and contains the read/write head. Slider 129 is bonded to read and write traces 120 and 130, where read and write signals are carried to and from the read/write head.

Figure 3:
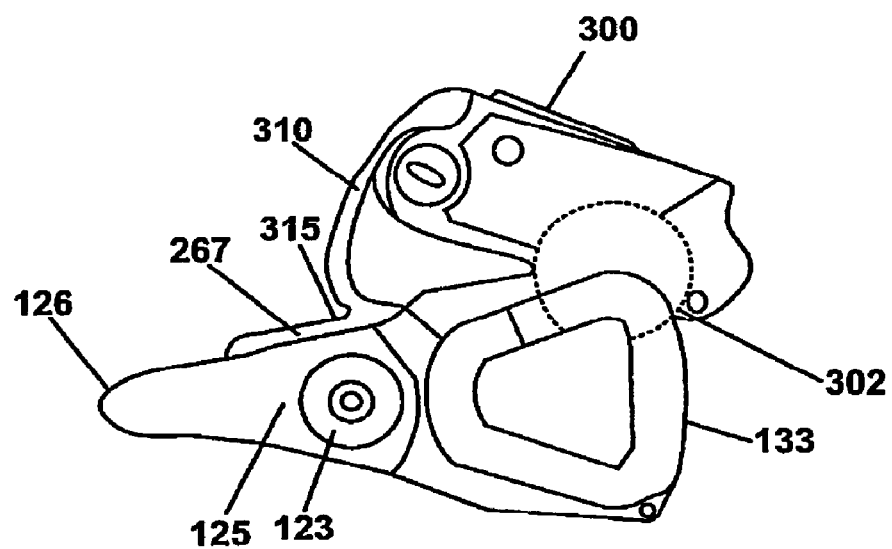
FIG. 3 is a top plan view of an actuator yoke assembly installed on a flex cable bracket in accordance with an embodiment of the present invention.

Flex cable interconnector 267 of ELS 127 provides a communicative coupling to a flex cable connector 315 of flex cable bracket 300 (FIG. 3). Flex cable interconnector 267 is further shown in FIGS. 6A and 6B. ELS 127 further includes flexing interconnect 205 which can be formed from a laminate, according to an embodiment, of at least three layers, of materials. A signal-conductor layer may be a highly conductive metal, e.g., copper, from which the read and write traces 120 and 130 are formed. A middle layer 370 can be an insulating dielectric layer, e.g., polyimide, separating the top layer from which write and read traces 120 and 130 are formed from a base metal layer 380, such as stainless steel from which serpentine patterns are formed. Although an ELS having a flexing interconnect is shown, it is appreciated that the present invention may be implemented on a plurality of ELS configurations including ELS having more or fewer components than the exemplary ELS described herein.

In an HSA (head stack assembly), a portion of the assembly process includes the connecting of a connector of a flex cable bracket (connector 315 of FIGS. 3, 4 and 6A-6B) to the connector of an ELS, e.g., connector 267 of ELS 127 of FIGS. 3, 4 and 6A-6B. The process further includes, and subsequent to installing an actuator carriage on a flex bracket, soldering the flex cable 310 (connector 315) to the ELS 127 (connector 267).

Typically, the soldering process necessitates pulling out or twisting the flex cable to provide sufficient clearance so that solder operators or robotized devices can perform the solder process.

Subsequent to the soldering process being performed, the HSA together with the flex cable assembly is transported on a transportation tool and proceeds to baking, washing and cleaning processes, during which time both the HSA and flex cable assembly are subject to damage.

Accordingly, embodiments of the present invention provide for retaining an actuator assembly on a flex cable bracket when the actuator assembly is engaged thereon. Embodiments of the present invention further provide against vertical, horizontal (perpendicular relative to vertical) and rotational movement of the actuator assembly during those processes as described above. It is noted that other processes that may cause damage to the actuator assembly and the flex cable assembly may find embodiments of the present invention to beneficial is reducing component damage during the assembly process.

FIG. 3 is a plan view of an actuator yoke installed in a flex cable bracket. Actuator yoke 126 is shown to include actuator arm 125, pivot assembly 123 and voice coil 133, as shown in FIG. 1, and a flex cable interconnect 267 for receiving and having coupled (soldered) thereto a flex cable end connector from a flex cable bracket, e.g., flex cable end connector 315 of flex cable 310 of flex cable bracket 300. Flex cable bracket 300 is shown to include a flex cable latching mechanism, generally indicated by dashed line 302, in an embodiment of the present invention. Flex cable bracket 300 further includes a flex cable 310 having a flex cable end connector 315. Flex cable end connector 315 is for coupling flex cable 310 to a flex cable interconnect of an ELS, e.g., flex cable interconnect 267, in an embodiment of the present invention.

Figure 4:
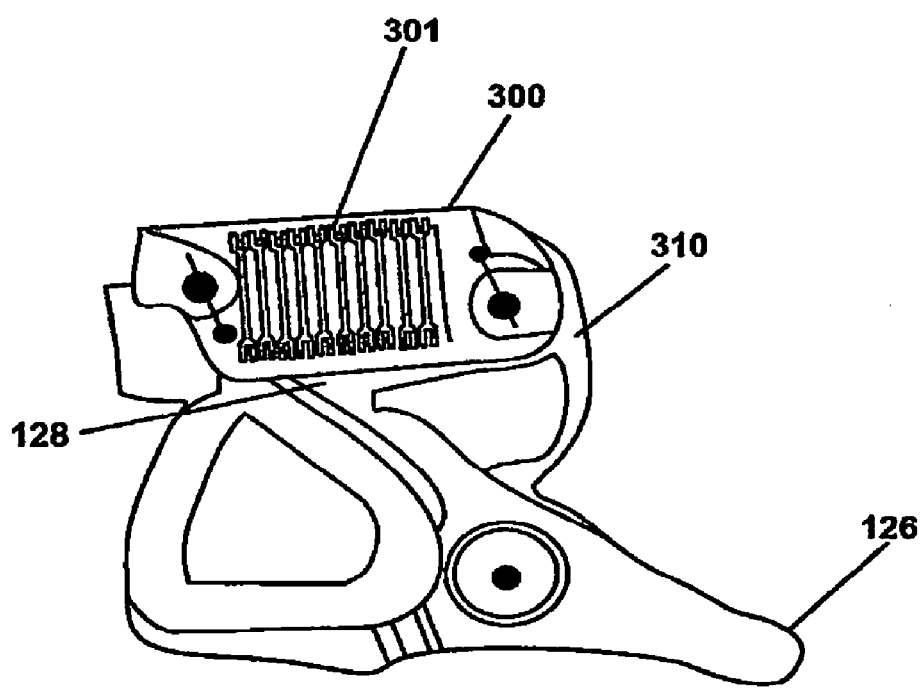
FIG. 4 is an underside view of the flex cable bracket and actuator yoke assembly of FIG. 3.

FIG. 4 is an inverted plan view of the actuator yoke and flex cable bracket of FIG. 3. Flex cable bracket 300 is shown to further include a flex cable bracket connector 301. Flex cable bracket connector 301 is for communicatively coupling flex cable bracket 300 to an actuator 121 assembly (FIG. 1). Alternatively, flex cable bracket connector 301 may be for communicatively coupling flex cable bracket 300 to a controller 119 (FIG. 1). Further alternatively, flex cable bracket connector 301 may be communicatively coupling flex cable bracket 300 to a controller 119 and an actuator 121 (FIG. 1).

Figure 5A:
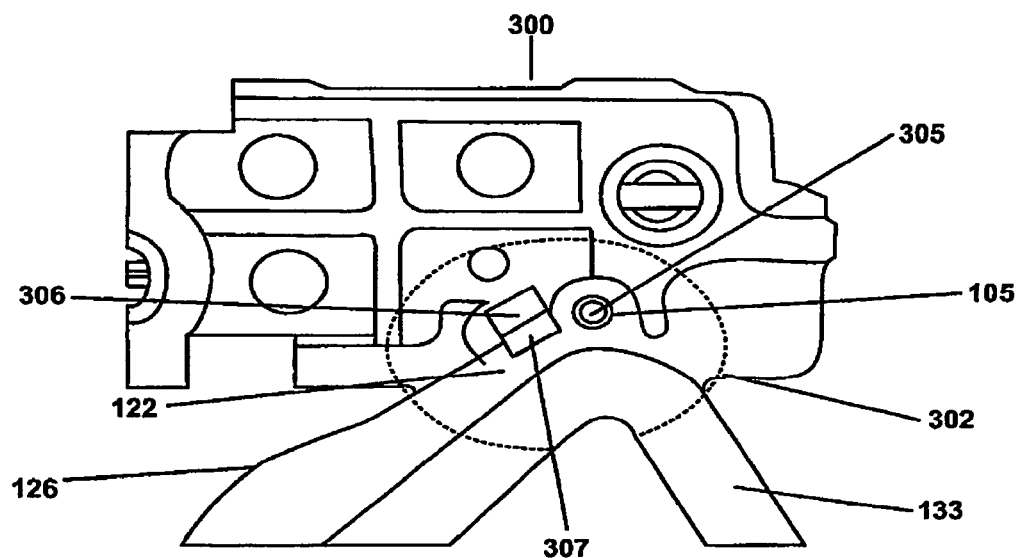
FIG. 5A is a plan view of an actuator yoke assembly installed on a flex cable bracket having a flex cable latching mechanism integrated therein, in accordance with an embodiment of the present invention.

FIG. 5A is a plan view of a flex cable bracket 300 having disposed thereon an actuator yoke in an embodiment of the present invention. Flex cable bracket 300 is shown to have a flex cable latching apparatus 302 integrated into the structure of flex cable bracket 300. Flex cable latching apparatus 302 is shown to include a yoke position limiter 305, a yoke rotation limiter 304 (shown in FIG. 5B), a yoke spring clip 306, and a vertical position limiter 308 (shown in FIG. 5B). Yoke position limiter 305 is configured to fit within an opening disposed on actuator yoke 126, e.g., opening 105, and to provide against horizontal movement of flex cable bracket 300 when an actuator yoke 126 is disposed thereon. Spring latch portion 306 is for providing against vertical movement of an actuator yoke disposed on flex cable bracket 300.

FIG. 5B is a plan view of a flex cable bracket 300 having a flex cable latching apparatus 302 integrated therein, shown without an actuator yoke disposed thereon to more particularly describe embodiments of the present invention. Flex cable latching apparatus 302 is shown to be comprised of a yoke position limiter 305. In the present embodiment, yoke position limiter 305 is a cylindrical pin that is configured to go through an opening in actuator yoke assembly 126, e.g., opening 105, so as to prevent horizontal movement of yoke assembly 126 when assembly 126 is positioned upon flex cable bracket 300. Alternatively, yoke position limiter 305 may be of other shapes, provided that the shape of limiter 305 fits within the opening 105 of actuator yoke assembly 126.

Flex cable latching apparatus 302 further includes a yoke rotation limiter 304 in an embodiment of the present invention. Yoke rotation limiter 304 is a vertically oriented structure that parallels the vertical axis of yoke position limiter 305 and is disposed proximal to yoke position limiter 305. In an embodiment of the present invention, limiter 304 is configured to conform to the shape of the portion of actuator yoke assembly 126 having opening 105. Yoke rotation limiter 304 provides against rotational movement of an actuator yoke assembly 126 when disposed thereon.

Flex cable latching apparatus 302 of FIG. 5B further includes a yolk spring clip 306 shown as integrated into flex cable bracket 300 in an embodiment of the present invention. Yoke spring clip 306 is configured with spring loading and a cantilever beam portion 307. Spring loading provides for exerting a counter force against rotation of actuator yoke assembly 126 in a clock wise direction. In an embodiment of the present invention, spring loading of yoke spring clip 306 is achieved through utilization of the structural rigidity and flexibility of the material used to fabricate yoke spring clip 306, meaning that as a force, perpendicular to vertical axis of yolk position limiter 305, is applied against yolk spring clip 306, the physical characteristics of yoke spring clip 306 exerts a force opposite the force applied thereto. Alternatively, yoke spring clip 306 may be configured with a mechanical device, such as a spring, to provide an opposing force.

Cantilever beam 307 of yoke spring clip 306 is configured to rest upon an uppermost surface of an actuator yolk assembly 126, e.g., surface 122, such that vertical motion, vertical motion being parallel with the vertical axis of yoke position limiter 305, is restricted. Cantilever beam 307 prevents opening 105 of actuator yolk assembly 126 from becoming disengaged from yoke position limiter 305 when installed thereon. In an embodiment of the present invention, yoke spring clip 306 may be comprised of plastic. Alternatively, yoke spring clip 306 may be comprised of metal or other material that provides similar structural characteristics.

It is particularly noted that in an embodiment of the present invention, an operator or robotized device may unclip yolk spring clip 306 from actuator yolk assembly 126 subsequent to completion of the HSA processing by flipping the cantilever beam 307 away from actuator yolk assembly 126.

Flex cable latching apparatus 302 of FIG. 5B further includes a yolk spring clip 306 shown as integrated into flex cable bracket 300 in an embodiment of the present invention. Yoke spring clip 306 is configured with spring loading and a cantilever beam portion 307. Spring loading provides for exerting a counter force against rotation of actuator yoke assembly 126 in a clock wise direction. In an embodiment of the present invention, spring loading of yoke spring clip 306 is achieved through utilization of the structural rigidity and flexibility of the material used to fabricate yoke spring clip 306, meaning that as a force, perpendicular to vertical axis of yoke position limiter 305, is applied against yoke spring clip 306, the physical characteristics of yoke spring clip 306 exerts a force opposite the force applied thereto. Alternatively, yoke spring clip 306 may be configured with a mechanical device, such as a spring, to provide an opposing force.

Cantilever beam 307 of yoke spring clip 306 is configured to rest upon an uppermost surface of an actuator yoke assembly 126, e.g., surface 122, such that vertical motion, vertical motion being parallel with the vertical axis of yoke position limiter 305, is restricted. Cantilever beam 307 prevents opening 105 of actuator yolk assembly 126 from becoming disengaged from yoke position limiter 305 when installed thereon. In an embodiment of the present invention, yoke spring clip 306 may be comprised of plastic. Alternatively, yoke spring clip 306 may be comprised of metal or other material that provides similar structural characteristics.

It is particularly noted that in an embodiment of the present invention, an operator or robotized device may unclip yoke spring clip 306 from actuator yoke assembly 126 subsequent to completion of the HSA processing by flipping the cantilever beam 307 away from actuator yoke assembly 126.

Flex cable latching mechanism 302 further includes a vertical orientation and position limiter 308. Vertical orientation and position limiter 308 has a surface 309 upon which surface 128 (FIG. 4) of actuator yoke assembly 126 (FIG. 4) rests. Vertical orientation and position limiter 308 provides an additional support point, such that a force exerted upon surface 122 by cantilever beam 307 does not cause yoke position limiter 305 to act as a fulcrum.

Viewing the underside of the flex cable bracket 300 of FIG. 5B having an actuator yoke assembly 126 engaged thereon would from this perspective reveal surface 128 (FIG. 4) of actuator yoke assembly 126 (FIG. 4) resting upon, or in contact with, surface 309 of vertical orientation and position limiter 308, according to an embodiment of the present invention.

Figure 6A:
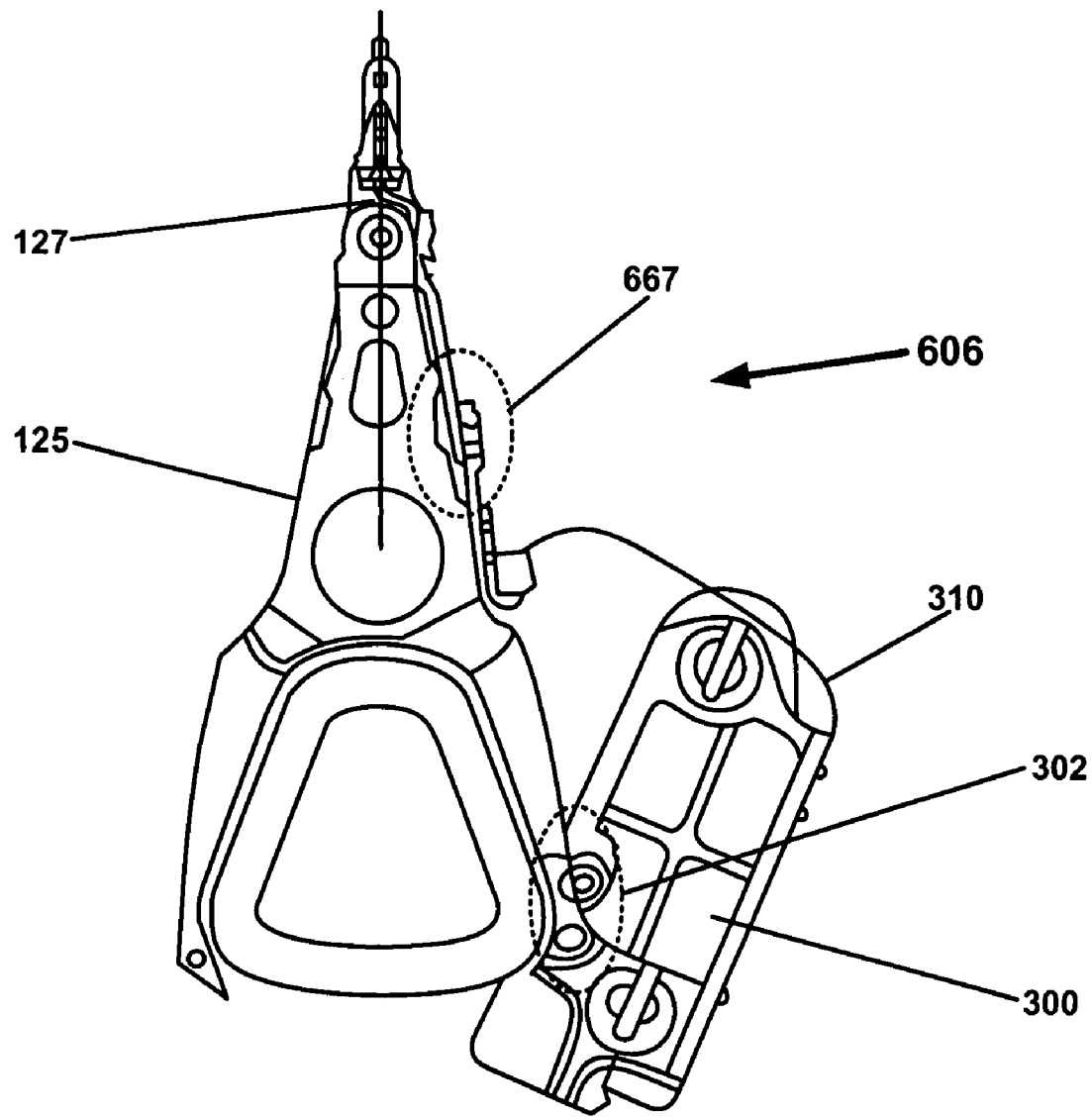
FIG. 6A is a plan view of an ELS coupled to a flex cable bracket having a flex cable latching mechanism integrated therein, in accordance with an embodiment of the present invention.

FIG. 6A is a plan view of an actuator arm, e.g., actuator arm 125 of FIG. 1, communicatively coupled with a flex cable bracket 300 in an embodiment of the present invention. Flex cable bracket 300 is configured with a flex cable latching mechanism 302 as described herein with reference to FIGS. 3, 4 and 5A-5B. As such, flex cable 310 has a flex cable connector 315 extending there from which is communicatively coupled to suspension connector 267, shown in FIGS. 2, 3 and 4, and is indicated within subsection 667 and which is shown in detail in FIG. 6B. Further shown is an energy source 606 that can be applied to suspension connector 267 and flex cable connector 315 to perform a solder reflow process (soldering) so as to solder connector 315 to connector 267. In an embodiment of the present invention, energy source 606 is a laser beam for achieving the solder reflow process. Alternatively, other energy sources and devices may be used to achieve soldering including, but not limited to a soldering iron, heat, a focused infrared light, and an oven.

Figure 6B:
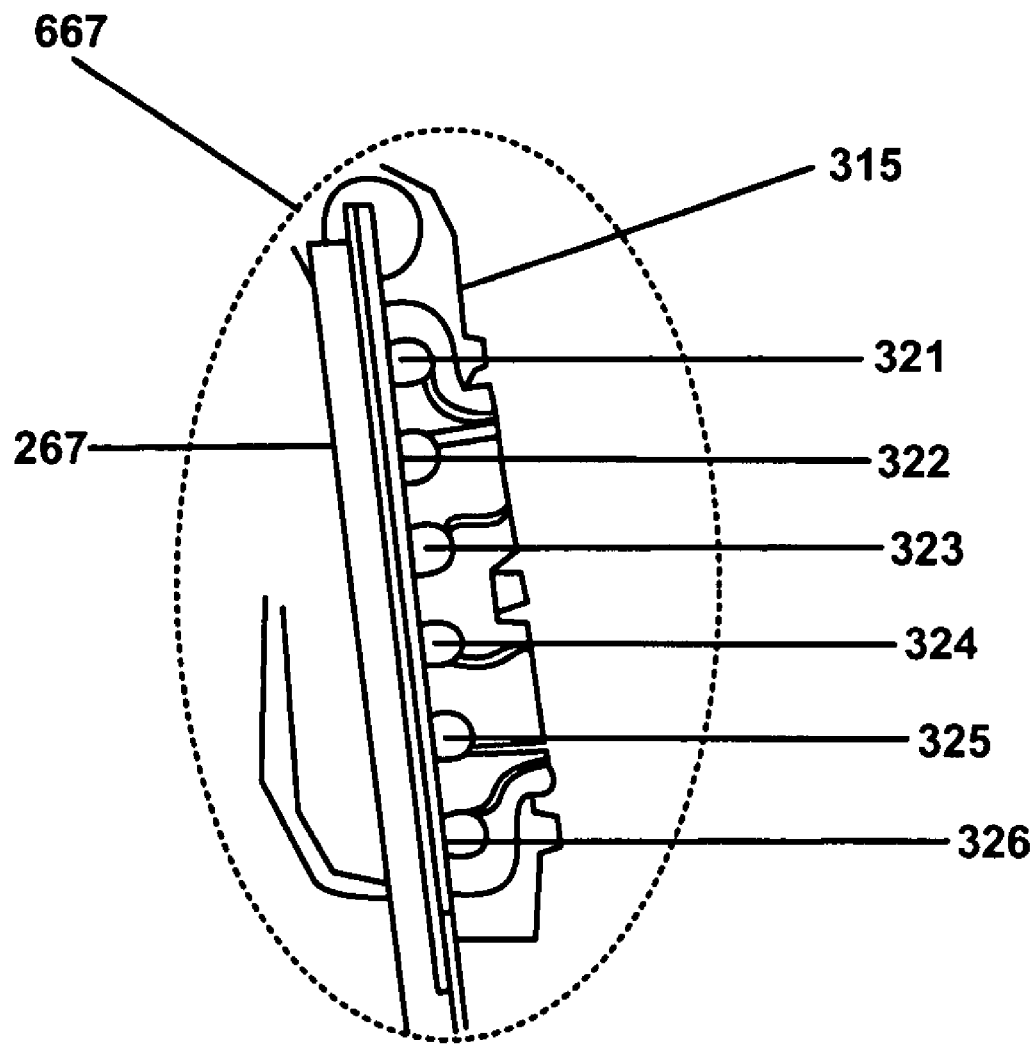
FIG. 6B is a plan view of the solderable portion of the ELS and flex cable bracket of FIG. 6A in accordance with the present embodiment.

FIG. 6B is an expanded plan view of subsection 667 and which includes the junction of connector 267 of ELS 127 and flex cable connector 315 of FIG. 6A. Connector 267 is shown to include a plurality of solder pads 321-326 that are configured to have soldered thereto an associated equal number of bonding pads disposed on flex cable connector 315 from flex cable bracket 310. Subsequent to connector 315 from flex cable 310 being soldered to connector 267 of ELS 127, a communication link between ELS 127 and flex cable bracket 300 is established.

Figure 7:
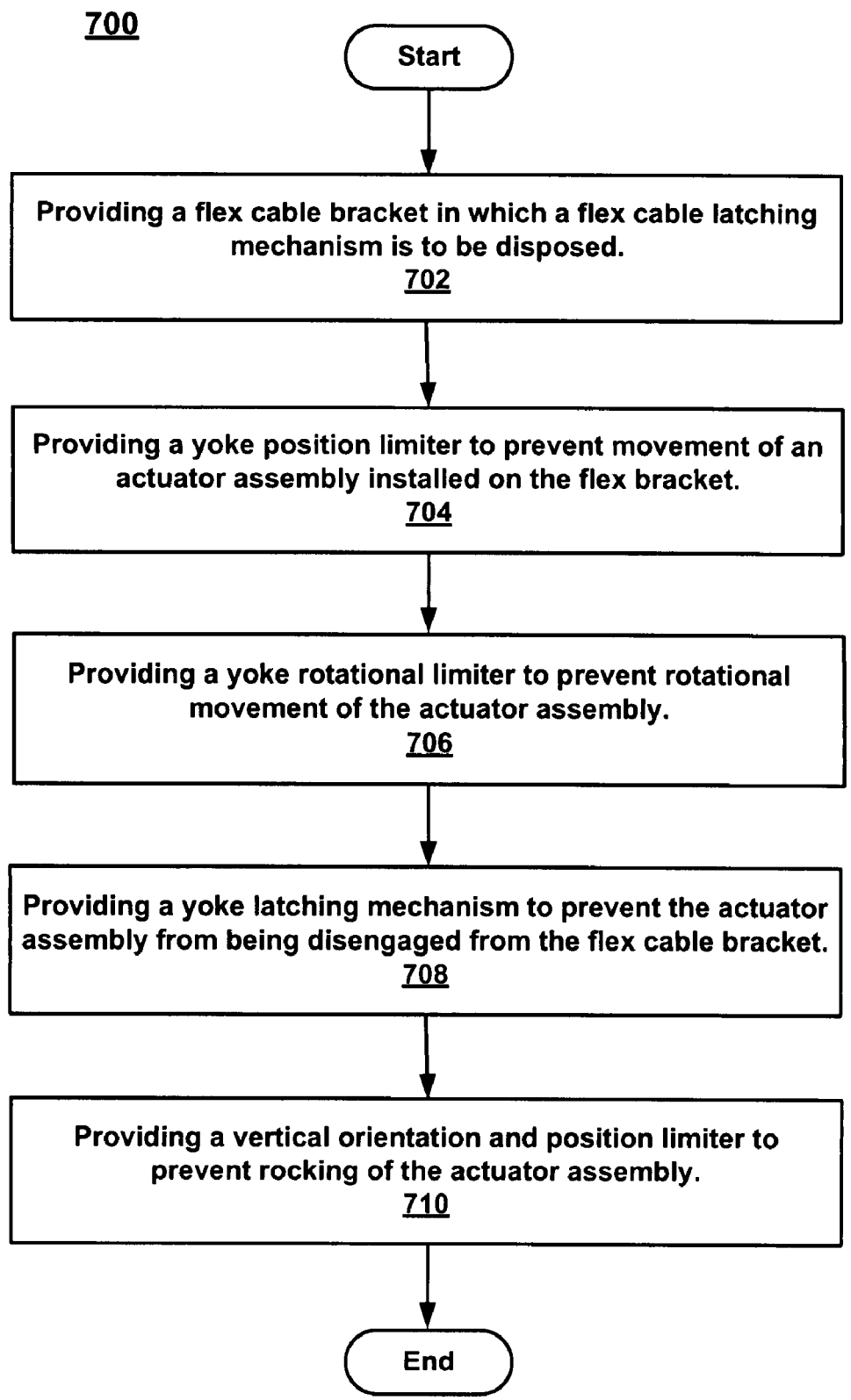
FIG. 7 is flowchart of a process for providing a flex cable latching mechanism in a flex cable bracket in accordance with embodiments of the present invention.

FIG. 7 is a flowchart of a process 700 for providing a flex cable latching mechanism in a flex cable bracket in an embodiment of the present invention. FIG. 7 is a flow chart of a process 7 in which particular steps are performed in accordance with an embodiment of the present invention for a flex cable bracket having a flex cable latching mechanism. Although specific steps are disclosed in process 700, such steps are exemplary. That is, the present invention is well suited to performing various other steps or variations of the steps recited in FIG. 7. Within the present embodiment, it should be appreciated that the steps of process 700 may be performed by software, by hardware, by an assembly mechanism, through human interaction, or by any combination of software, hardware, assembly mechanism, and human interaction.

Process 700 will be described with reference to components and devices shown in FIGS. 5A and 5B.

In step 702 of process 700, a flex cable bracket, e.g., flex cable bracket 300 of FIGS. 5A-5B is provided and into which a cable latching mechanism, e.g., flex cable latching mechanism 302 of FIGS. 5A-5B, is to be integrated, in an embodiment of the present invention. In an embodiment, the flex cable bracket 300 and the flex cable latching mechanism 302 are concurrently fabricated. In another embodiment, flex cable latching mechanism 302 is fabricated separate from flex cable bracket 300 and is subsequently integrated into flex cable bracket 300.

In step 704 of process 700, a yoke position limiter, e.g., yoke position limiter 305 of FIGS. 5A-5B, is formed within the structure of flex cable bracket 300 and becomes a component in flex cable latching mechanism 302 in an embodiment of the present invention. Yoke position limiter 305 is configured to fit within an opening in an actuator assembly 126, e.g., opening 105. Yoke position limiter 305 provides for preventing horizontal movement of an actuator assembly 126 (horizontal relative to the vertical axis of yoke position limiter 305).

In step 706 of process 700, a yoke rotation limiter, e.g., yoke rotational limiter 304 of FIGS. 5A-5B, is integrated into the structure of flex cable bracket 300 in an embodiment of the present invention. Yoke rotational limiter 304 is disposed proximal to yoke position limiter 305 and is oriented to be parallel to the axis of yoke position limiter 305. Yoke rotational limiter 304 is configured to conform to the contour of actuator assembly 126 in which opening 105 is disposed.

In step 708 of process 700, a yoke spring clip, e.g., yoke spring clip 306 of FIGS. 5A-5B, is integrated into the structure of flex cable bracket 300 in an embodiment of the present invention. Yoke spring clip 306 includes a spring function that, in one embodiment, is incorporated into the structure of the clip 306. In an alternative embodiment, a mechanical spring device may be incorporated into the structure of clip 306. The force generated by yoke spring clip 306 opposes force generated by an actuator assembly 126 subject to rotational and horizontal movement.

Yoke spring clip 306 further includes a cantilever beam 307 that is adapted to be disposed on an upper surface of an actuator assembly 126, e.g., surface 122 as shown in FIG. 5A. Cantilever beam 307 prevents an actuator assembly 126 from disengaging from yoke position limiter 305.

Figure 5C:
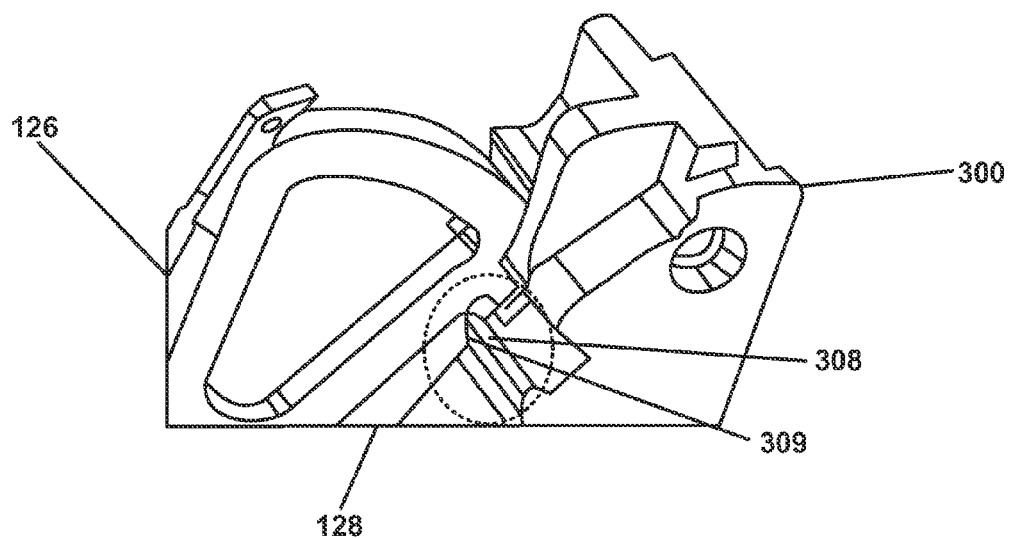
FIG. 5B is a side plan view of the flex cable bracket of FIG. 5A depicting the components of a flex cable latching mechanism in accordance with an embodiment of the present invention.

In step 710 of process 700, a yoke vertical orientation and position limiter, e.g., yoke vertical orientation and position limiter 308 of FIG. 5B, is integrated into the structure of flex cable bracket 300 in an embodiment of the present invention. Yoke vertical orientation and position limiter 308 includes a surface 309 that is configured to have disposed thereon a surface of an actuator assembly, e.g., surface 128 of actuator assembly 126, as shown in FIG. 5C. Limiter 308 and surface 309 prevent a downward force from causing yoke position limiter 305 to act as a fulcrum.

In step 710 of process 700, a yoke vertical orientation and position limiter, e.g., yoke vertical orientation and position limiter 308 of FIG. 5B, is integrated into the structure of flex cable bracket 300 in an embodiment of the present invention. Yoke vertical orientation and position limiter 308 includes a surface 309 that is configured to have disposed thereon a surface of an actuator assembly, e.g., surface 128 of actuator assembly 126.

Limiter 308 and surface 309 prevent a downward force from causing yoke position limiter 305 to act as a fulcrum.

Embodiments of the present invention, in the various presented embodiments, provide for retaining an actuator assembly on a flex cable bracket when the actuator assembly is engaged thereon so as to minimize flex cable damage due to human and/or robotized handling. Embodiments of the present invention further provide against vertical, horizontal (perpendicular relative to vertical) and rotational movement of the actuator assembly during those processes as described above. Embodiments of the present invention additionally provide achieving an increase is manufacturing takt-time, the speed with which a product can be produced. Embodiments of the present invention also provide consistency of flex cable boundary conditions through mass production so as to ensure consistent file level flex cable related dynamics and hard disk drive functional performance. It is noted that other processes that may cause damage to the actuator assembly and/or the flex cable assembly may find embodiments of the present invention to be beneficial is reducing component damage during the assembly process.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A latching mechanism integral with a flex cable bracket, said latching mechanism comprising:
a position limiter configured to fit within an opening disposed on a yoke of an actuator assembly and for preventing horizontal movement of said actuator assembly installed thereon; and a spring clip having spring functionality for applying force to said actuator assembly coupled to said flex cable bracket and comprising a cantilever beam portion, wherein said cantilever beam portion comprises a bottom surface configured to contact an upper surface of said actuator assembly for restricting vertical movement of said actuator assembly contacting therewith.

2. The latching mechanism of claim 1, further comprising:
a vertical orientation position limiter comprising a surface configured to support a lower surface of said actuator assembly opposing said upper surface.

3. The latching mechanism of claim 2, wherein said position limiter, said spring clip, and said vertical orientation position limiter are integral portions of said flex cable bracket.

4. The latching mechanism of claim 1, further comprising:
a rotation limiter comprising a vertically oriented surface configured proximal to said position limiter and configured conformal to the shape of said actuator assembly, said rotation limiter for restricting rotational movement of said actuator assembly installed on said position limiter.

5. A flex cable bracket comprising:
a flex cable connector for communicatively connecting a flex cable to an external component;
an actuator retaining mechanism disposed on an opposing surface to said flex cable connector and configured for retaining an actuator assembly for coupling with said flex cable, said retaining mechanism comprising:
 a position limiter configured to fit within an opening disposed on an actuator assembly and for preventing horizontal movement of said actuator assembly installed thereon; and
 a spring clip having spring functionality for applying force to said actuator assembly coupled to said flex cable bracket and comprising a cantilever beam portion, wherein said cantilever beam portion comprises a bottom surface configured to contact an upper surface of said actuator assembly for restricting vertical movement of said actuator assembly contacting therewith.

6. The flex cable bracket of claim 5, further comprising:
a vertical orientation position limiter comprising a surface configured to support a lower surface of said actuator assembly opposing said upper surface.

7. The flex cable bracket of claim 6, wherein said position limiter, said spring clip, and said vertical orientation position limiter are integral portions of said flex cable bracket.

8. The flex cable bracket of claim 5, further comprising:
a rotation limiter comprising a vertically oriented surface configured proximal to said position limiter and configured conformal to the shape of said actuator assembly, said rotation limiter for restricting rotational movement of said actuator assembly installed on said position limiter.

9. A hard disk drive comprising:
an enclosure;
a magnetic-recording head;
a magnetic-recording disk rotatably mounted on a spindle; and
an flex cable bracket comprising:
 a position limiter configured to fit within an opening disposed on an actuator assembly and for preventing horizontal movement of said actuator assembly installed thereon; and
 a spring clip having spring functionality for applying force to said actuator assembly coupled to said flex cable bracket and comprising a cantilever beam portion, wherein said cantilever beam portion comprises a bottom surface configured to contact an upper surface of said actuator assembly for restricting vertical movement of said actuator assembly contacting therewith.

10. The hard disk drive of claim 9, said flex cable bracket further comprising:
a vertical orientation position limiter comprising a surface configured to support a lower surface of said actuator assembly opposing said upper surface.

11. The hard disk drive of claim 10, wherein said position limiter, said spring clip, and said vertical orientation position limiter are integral portions of said flex cable bracket.

12. The f hard disk drive of claim 9, said flex cable bracket further comprising:
a rotation limiter comprising a vertically oriented surface configured proximal to said position limiter and configured conformal to the shape of said actuator assembly, said rotation limiter for restricting rotational movement of said actuator assembly installed on said position limiter.

* * * * *